United States Patent
Budmiger

[19]

[11] Patent Number: 5,907,103
[45] Date of Patent: May 25, 1999

[54] INSTRUMENTATION AMPLIFIER ARRANGEMENTS OF ELECTROMAGNETIC FLOWMETERS

[75] Inventor: Thomas Budmiger, Ettingen, Switzerland

[73] Assignee: Endress + Hauser Flowtec AG, Reinach, Switzerland

[21] Appl. No.: 08/870,255

[22] Filed: Jun. 6, 1997

Related U.S. Application Data

[60] Provisional application No. 60/020,431, Jun. 25, 1996.

[30] Foreign Application Priority Data

Jun. 20, 1996 [EP] European Pat. Off. .............. 96810413
Apr. 19, 1997 [EP] European Pat. Off. .............. 97106513

[51] Int. Cl.$^6$ ....................................................... G01F 1/60
[52] U.S. Cl. ............................................................ 73/861.17
[58] Field of Search ............................ 73/861.15–861.17

[56] References Cited

U.S. PATENT DOCUMENTS

| | | | |
|---|---|---|---|
| 4,089,219 | 5/1978 | Suzuki | 73/861.16 |
| 4,210,022 | 7/1980 | Boss . | |
| 4,382,387 | 5/1983 | Hafner . | |
| 4,422,337 | 12/1983 | Hafner . | |
| 4,676,112 | 6/1987 | Uematsu et al. | 73/861.17 |
| 4,704,908 | 11/1987 | Blatter . | |
| 5,079,957 | 1/1992 | Wehrs | 73/861.17 |
| 5,351,554 | 10/1994 | Budmiger . | |
| 5,370,000 | 12/1994 | Herwig et al. . | |
| 5,388,465 | 2/1995 | Okaniwa et al. | 73/861.17 |
| 5,402,685 | 4/1995 | Brobeil . | |

OTHER PUBLICATIONS

Sanderson, M.L., *Principles and Practice of Electromagnetic Flow Measurement*, Mar., 1991, 1207a Journal A, Antwerp, Belgium, pp. 19–26.

*Primary Examiner*—Richard Chilcot
*Assistant Examiner*—Jewel Thompson
*Attorney, Agent, or Firm*—Bose McKinney & Evans

[57] ABSTRACT

Instrumentation amplifier arrangements (10, 10') of electromagnetic flowmeters are disclosed which permit reliable conditioning of the measuring-electrode signals without an increase in coil current even if solids-loaded fluids are measured. The flowmeter has a measuring tube (1) with at least two measuring electrodes (3, 2) and a ground electrode (4) as well as a coil arrangement (5) for producing a magnetic field. A first variant of the instrumentation amplifier arrangement comprises two preamplifiers (11, 12) each connected to a respective one of the two measuring electrodes (3, 2) and followed by a respective ana-log-to-digital converter (13, 14). A clock generator (18) supplies the analog-to-digital converters (13, 14) with a sampling signal whose frequency is greater than approximately 1 kHz. The analog-to-digital converters (13, 14) are followed by a subtractor (17). A second variant comprises two preamplifiers (11', 12') each connected to a respective one of the two measuring electrodes, an analog-to-digital converter (13') connected directly to the output of one (11') of the preamplifiers (11', 12'), a differential stage (19) following the preamplifiers, and an analog-to-digital converter (20) following the differential stage (19). The analog-to-digital converters (13', 20) are followed by a subtractor (17').

8 Claims, 2 Drawing Sheets

INSTRUMENTATION AMPLIFIER ARRANGEMENTS OF ELECTROMAGNETIC FLOWMETERS

This application claims benefit of Provisional Appl. No. 60/020,431 filed Jun. 25, 1996.

FIELD OF THE INVENTION

The present invention relates to instrumentation amplifier arrangements of electromagnetic flowmeters.

BACKGROUND OF THE INVENTION

Electromagnetic flowmeters measure the volumetric flow rate of an electrically conductive fluid flowing in a measuring tube. The part of the measuring tube which comes into contact with the fluid is electrically nonconductive, so that a voltage induced by a magnetic field according to Faraday's law of induction would not be short-circuited if the measuring tube were completely made of metal, i.e., if the fluid came into contact with the metal. The magnetic field generally cuts the measuring tube in a direction perpendicular to the longitudinal axis of the tube.

Therefore, metallic measuring tubes, which, of course, must not be ferromagnetic so as not to disturb the magnetic field, are commonly provided with an electrically nonconductive inner layer as insulation; in the case of plastic or ceramic measuring tubes, this non-conductive layer is not necessary.

The induced voltage is picked off by means of galvanic or capacitive measuring electrodes. Galvanic measuring electrodes extend through the wall of the measuring tube and thus contact the fluid, while capacitive measuring electrodes are so fitted in the wall of the measuring tube as not to contact the fluid, or are mounted on the wall of the measuring tube.

U.S. Pat. No. 5,402,685 discloses an arrangement for operating several electromagnetic flow sensors with a single electronic evaluating unit, said arrangement comprising the following parts, which are of interest in connection with the present invention:
- a first measuring tube with two galvanic measuring electrodes and with an associated coil arrangement for producing a magnetic field;
- a second measuring tube with two galvanic measuring electrodes and with an associated coil arrangement for producing a magnetic field;
- a third measuring tube with two galvanic measuring electrodes and with an associated coil arrangement for producing a magnetic field;
- a penultimate measuring tube with two galvanic measuring electrodes and with an associated coil arrangement for producing a magnetic field;
- a last measuring tube with two galvanic measuring electrodes and with an associated coil arrangement for producing a magnetic field;
- a single processing unit for potentials of the measuring electrodes;
- a single generator circuit for producing a single coil current for the coil arrangements; and
- a switching arrangement for connecting the coil arrangement of a respective one of the measuring tubes to the generator circuit, and the measuring electrodes of said measuring tube to the processing unit.

As for the processing of the signals from the measuring electrodes, U.S. Pat. No. 5,402,685 merely includes a general reference to U.S. Pat. Nos. 4,210,022, 4,422,337, 4,382,387, and 4,704,908. All of these, however, describe measuring circuits without analog-to-digital converters.

U.S. Pat. No. 5,351,554 discloses an instrumentation amplifier arrangement of an electromagnetic flowmeter
- which comprises a measuring tube with two galvanic measuring electrodes and a coil arrangement for producing a magnetic field,
- said instrumentation amplifier arrangement comprising:
  - a single differential stage having its input end connected to each of the measuring electrodes;
  - an analog-to-digital converter following the differential stage; and
  - a clock generator supplying a sampling signal to the analog-to-digital converter.

In addition, this U.S. Pat. No. 5,351,554 mentions that in the circuit arrangement described therein, arrangements for compensating electrochemical interference voltages as are described in U.S. Pat. Nos. 4,210,022 and 4,704,908 can be used.

U.S. Pat. No. 5,370,000 describes an electromagnetic flowmeter comprising the following parts, which are of interest in connection with the present invention:
- a measuring tube with a first and a second galvanic measuring electrode;
- a coil arrangement for producing a magnetic field by means of a coil current;
- said instrumentation amplifier arrangement comprising:
  - a first impedance converter following the first measuring electrode;
  - a second impedance converter following the second measuring electrode;
  - a first double-throw switch having a first input and a second input connected to the output of the first impedance converter and to ground, respectively;
  - a second double-throw switch having a first input and a second input connected to the output of the second impedance converter and to ground, respectively;
  - an analog differential stage connected to an output of the first double-throw switch and to the output of the second double-throw switch;
  - a further amplifier for a voltage developed across a resistor traversed by the coil current;
  - a multiplexer connected to an output of the differential stage and to an output of the further amplifier; and
  - an analog-to-digital converter following the multiplexer.

The prior-art instrumentation amplifier arrangements have proved effective many times. They operate with a coil-current value of, e.g., 85 mA. However, if fluids with high solids contents are to be measured, as is frequently necessary in the construction industry (stones in chuted concrete) or in the paper industry (wood fibers in paper stock), for example, solid particles striking the measuring electrodes will result in noise voltages, and thus in a degradation of the signal-to-noise ratio.

Attempts have been made to eliminate this degradation by increasing the coil current and, thus, the induced voltage picked off the measuring electrodes. However, this requires, among other things, more powerful power supplies, which, in turn, exhibit greater losses, so that total energy consumption increases. Also, larger electronics housings may be necessary.

SUMMARY OF THE INVENTION

It is, therefore, an object of the invention to provide instrumentation amplifier arrangements of electromagnetic flowmeters which permit reliable conditioning of the measuring-electrode signals even if solids-loaded fluids, particularly fluids having a high solids content, are measured. In particular, the invention is to eliminate the need to increase the value of the coil current, i.e., the invention is to make it possible to operate coils with the aforementioned coil-current value of 85 mA even in the presence of high solids contents.

To attain this object, a first variant of the invention provides an instrumentation amplifier arrangement of an electromagnetic flowmeter
  which comprises a measuring tube with at least two measuring electrodes and a ground electrode as well as a coil arrangement for producing a magnetic field,
  said instrumentation amplifier arrangement comprising per measuring electrode:
    a preamplifier connected to the measuring electrode at its input end; and
    an analog-to-digital converter connected directly to an output of the preamplifier;
  said instrumentation amplifier arrangement further comprising:
    a clock generator supplying the analog-to-digital converters with a sampling signal
      whose frequency is greater than approximately 1 kHz; and
    a subtractor following the analog-to-digital converters.

To attain this object, a second variant of the invention provides an instrumentation amplifier arrangement of an electromagnetic flowmeter
  which comprises a measuring tube with at least two measuring electrodes and a ground electrode as well as a coil arrangement for producing a magnetic field,
  said instrumentation amplifier arrangement comprising:
    one preamplifier per measuring electrode;
    a first analog-to-digital converter connected directly to an output of one of the preamplifiers;
    a differential stage following the preamplifiers;
    a second analog-to-digital converter following the differential stage;
    a subtractor following the analog-to-digital converters; and
    at least one clock generator supplying the analog-to-digital converters with a sampling signal
      whose frequency is greater than approximately 1 kHz.

According to one preferred development of the first variant of the invention, there are provided a differential stage and a further analog-to-digital converter coupled to the output of the differential stage and controlled by the clock generator, with a respective one of inputs of the differential stage being connected to the output of the associated preamplifier, and the output of the further analog-to-digital converter being coupled to a further subtrahend input of the subtractor.

According to another preferred development of the first variant of the invention or according to a preferred embodiment of the second variant, the analog-to-digital converters are united in a main analog-to-digital converter, and a multiplexer is inserted between the input of the main analog-to-digital converter and the outputs of the preamplifiers.

According to a combination of the above developments of the invention, a further input of the multiplexer is connected to the output of the differential stage.

One advantage of the invention is that the outputs of the analog-to-digital converters, or the output of the main analog-to-digital converter, provide digital signals with which, because of the high frequency of the sampling signal compared to the hitherto used frequency of up to approximately 100 Hz, namely a frequency greater than approximately 1 kHz, no difficulties are encountered in separating the wanted components from the unwanted components and in producing a volumetric flow rate signal with high accuracy, e.g., with ±5% accuracy.

BRIEF DESCRIPTION OF THE DRAWINGS

The invention and further advantages thereof will become more apparent from the following description of embodiments when taken in conjunction with the accompanying drawings, in which like parts are designated by like reference characters, and in which.

DETAILED DESCRIPTION OF THE DRAWINGS

Figure 1:
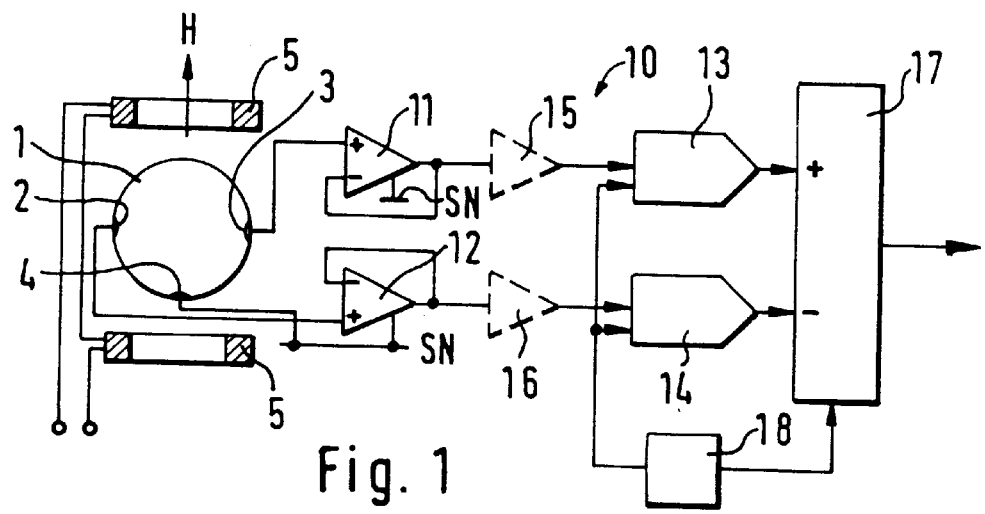
FIG. 1 is a block diagram of a first variant of an instrumentation amplifier arrangement.

In the block diagram of FIG. 1, a measuring tube 1 shown schematically in a cross-sectional view. Of its wall, only the inner surface is shown. A first measuring electrode 3 and a second measuring electrode 2 are fitted in the wall diagonally opposite each other, and a ground electrode 4 is fitted in the lower part of the measuring tube 1. The electrodes 2, 3, 4 are galvanic electrodes and are thus mounted in the wall in such a way as to contact the fluid flowing in the measuring tube 1 during operation.

The ground electrode 4 is connected to ground potential SN. It may be implemented with a concrete electrode which is designed similarly to the measuring electrodes 3, 2 and is fitted in the wall of the measuring tube 1, or in the form of a grounding ring clamped between a flange of the measuring tube and a mating flange of the conduit carrying the fluid.

FIG. 1 also shows schematically a two-part coil arrangement 5 which in operation produces a magnetic field of strength H that cuts the measuring tube 1. To this end, the coil arrangement 5 is connected, via the terminals shown, to a suitable current generator. Since the latter is outside the scope of the invention, use can be made of all conventional current generators which produce a bipolar direct current or an alternative current, for example. Therefore, the generator is not shown in drawings.

An instrumentation amplifier arrangement 10 comprises a first measuring channel for the first measuring electrode 3 with a first preamplifier 11 having one input connected to this measuring electrode. The first preamplifier 11 has its output connected directly to a first analog-to-digital converter 13. An amplifier 15 may be connected between the first preamplifier 11 and the first analog-to-digital converter 13, as indicated by dotted lines.

Analogously, the instrumentation amplifier arrangement 10 comprises a second measuring channel for the second measuring electrode 2 with a preamplifier 12 having one input connected to this measuring electrode. The preamplifier 12 has its output connected directly to a second analog-to-digital converter 14. An amplifier 16 may be connected therebetween, as again indicated by dotted lines.

The instrumentation amplifier arrangement 10 further includes a subtractor 17 and a clock generator 18. The subtractor 17 is connected to the respective outputs of the analog-to-digital converters 13, 14, i.e., its minuend input is connected to the output of the analog-to-digital converter 13 and its subtrahend input to the output of the analog-to-digital converter 14. The output of the subtractor 17 provides a signal which is better suited for further processing than in conventional arrangements.

The clock generator 18 supplies the analog-to-digital converters 13, 14 with a sampling signal whose frequency is greater than approximately 1 kHz; preferably, this frequency is of the order of 10 kHz, i.e., between 5 kHz and 50 kHz. Furthermore, the clock generator 18 supplies a clock signal of a suitable frequency to the subtractor 17.

Figure 2:
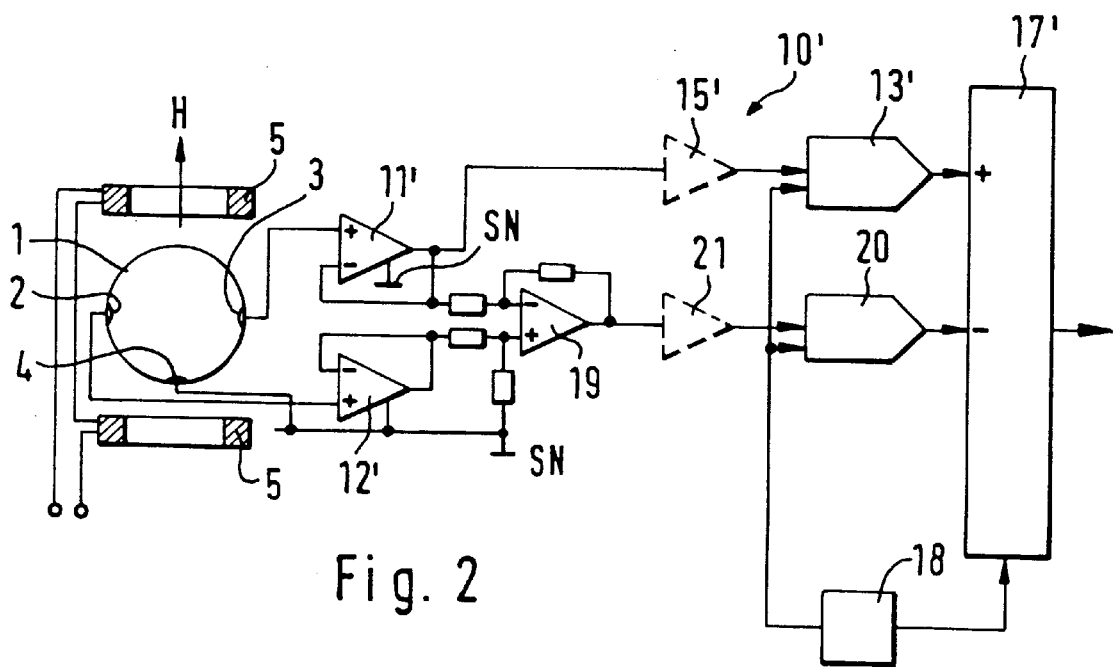
FIG. 2 is a block diagram of a second variant of an instrumentation amplifier arrangement.

FIG. 2 shows a second variant of the invention in the same representation as in FIG. 1. An instrumentation amplifier arrangement 10' comprises a first measuring channel for the first measuring electrode 3 with a first preamplifier 11' having one input connected to this measuring electrode. The first preamplifier 11' has its output connected directly to a first analog-to-digital converter 13'. An amplifier 15' may be connected between the first preamplifier 11' and the first analog-to-digital converter 13', as again indicated by dotted lines.

The instrumentation amplifier arrangement 10' further includes a differential stage 19 and a subsequent second analog-to-digital converter 20, which is also controlled by the clock generator 18. An amplifier 21 may be connected between the differential stage 19 and a the analog-to-digital converter 20, as again indicated by dotted lines. The two inputs of the differential stage 19 are connected to the outputs of the first and second premplifiers 11' and 12', respectively.

The instrumentation amplifier arrangement 10' further includes a subtractor 17' and again the clock generator 18. The subtractor 17' is connected to the respective outputs of the analog-to-digital converters 13', 20, i.e., its minuend input is connected to the output of the analog-to-digital converter 13' and its subtrahend input to the output of the analog-to-digital converter 20. The output of the subtractor 17' provides a signal which is again better suited for further processing than in conventional arrangements.

The two analog-to-digital converter 13', 20 may also be controlled by two clock generators which are independent of each other and generate clock signals having any of the abovementioned frequencies.

Since, in the second variant of the invention shown in FIG. 2, digital signals proportional to the signal at the measuring electrode 3 and to the difference of the signals at the measuring electrodes 3, 2 are presentd to the respective inputs of the subtractor 17', the digital signal with respect to the measuring electrode 2 can be precisely calculated from these two digital signals.

Figure 3:
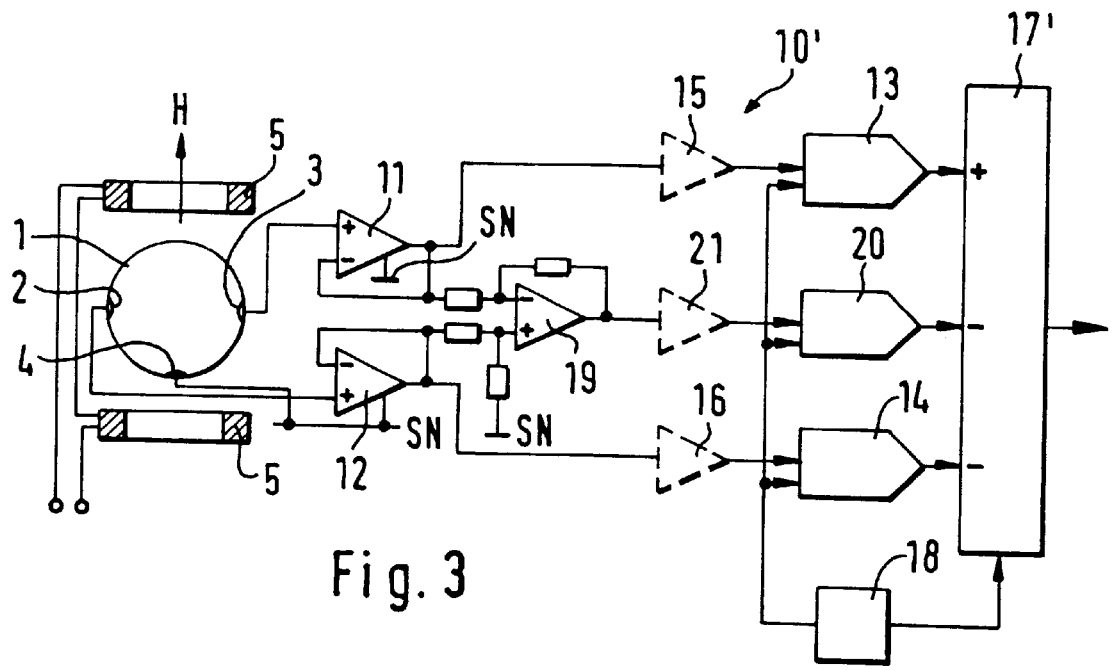
FIG. 3 is a block diagram of a development of the arrangement of FIG. 1.

FIG. 3 shows a preferred developement of the first variant of the invention in the same representation as in FIG. 1. It differs from the arrangement of FIG. 1 in that a differential stage 19 and a further analog-to-digital converter 20 connected to the output of this stage are provided. This analog-to-digital converter 20 is also controlled by the clock generator 18. The two inputs of the differential stage 19' are connected to the outputs of the preamplifiers 11 and 12, respectively. The output of the further analog-to-digital converter 20 is coupled to a further subtrahend input of the subtractor 17'.

In the arrangement of FIG. 3, a further amplifier 21 may be inserted between the output of the differential stage 19' and the input of the analog-to-digital converter 20, as again indicated by dotted lines.

Since, in the development of the invention shown in FIG. 3, digital signals proportional to the signal at the measuring electrode 3, to the signal at the measuring electrode 2, and to the difference of the signals at the measuring electrodes 3, 2 are presented to the respective inputs of the subtractor 17', so that these three digital signals contain redundancy in relation to the signals at the measuring electrodes 3, 2, it is within the scope of the invention to omit the above-explained second measuring channel in a manner analoguos to that in the second variant of FIG. 2, and to form the digital signal with respect to the measuring electrode 2 by computing the difference of the signals at the measuring electrodes 3, 2.

Figure 4:
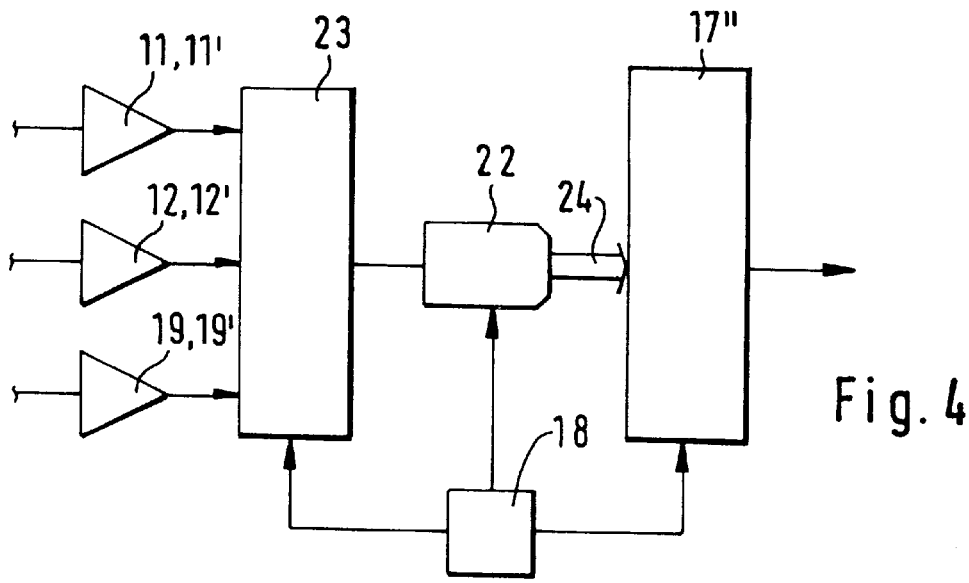
FIG. 4 is a block diagram of another development of the arrangement of FIG. 1.

In a further development of the invention, shown in FIG. 4 in a partial representation, the analog-to-digital converters 13, 14 of FIG. 1 or the analog-to-digital converters 13', 20 of FIG. 2 or the analog-to-digital converters 13, 14, 20 of FIG. 3 are united in a main analog-to-digital converter 22, and a multiplexer 23 is inserted between the input of the main analog-to-digital converter 22 and the respective outputs of the preamplifiers 11 or 11' and 12 or 12' and of the differential stage 19 or 19'. The multiplexer 23 is controlled by a further clock signal of suitable frequency from the clock generator 18.

The digital signals provided by the main analog-to-digital converter 22 are transferred either over the bus shown—in that case, the subtractor 17" is provided with a demultiplexer at its input end—or over single lines as in FIGS. 1 and 2—in that case, the main analog-to-digital converter 22 is provided with a demultiplexer at its output end.

Since the preamplifiers 11, 12 in FIGS. 1 and 3 and the preamplifiers 11', 12' in FIG. 2 are connected to ground potential SN, to which the ground electrode 4 is also connected as mentioned above, the respective signals at the measuring electrodes 3, 2, which are analog signals, are amplified separately with respect to the ground potential SN, and then converted from analog to digital form separately. The subtraction by means of the subtractor 17, 17' or 17" is performed only after the analog-to-digital conversion, i.e., in the digital portion of the arrangement.

Prior to the digital subtraction, the digital signals may be subjected to suitable signal processing.

Although the problem which gave rise to the invention arises only with galvanic electrodes, the invention can also be used in electromagnetic flowmeters with capacitive electrodes, of course. The above-mentioned advantages are also obtained with capacitive electrodes.

The invention is not limited to two measuring electrodes but can also be used in electromagnetic flowmeters with more than two measuring electrodes; in that case, another one of the above-explained measuring channels must be provided per measuring electrode.

The above-mentioned cirauit arrangements for compensating electrochemical interference voltages can also be used in the instrumentation amplifier arrangement of the invention. They must be so incorporated as to act on one of the above-explained analog signals.

The good separability of the unwanted components from the wanted components of the signals of the measuring electrodes, mentioned above as one of the advantages of the invention, can be achieved as follows, for example.

Since the outputs of the analog-to digital converter 13 of FIG. 1, the analog-to-digital converter 14 of FIG. 1, and the subtractor 17 provide a signal associated only with the measuring electrode 3, a signal associated only with the measuring electrode 2, and the difference of these measuring electrode signals, respectively, the difference can be compared with one or both measuring electrode signals, e.g. by means of a comparator. From this comparison, the plausibility of the individual measuring electrode signals can be inferred.

Similarly, in the arrangement of FIG. 3, the signals at the output of the analog-to-digital converter 13 and/or at the output of the analog-to-digital converter 14 can be compared with the signal at the output of the analog-to-digital converter 20 in order to determine the aforementioned plausibility. The output of the analog-to-digital converter 20 provides a difference signal equal to the analog difference of the measuring electrode signals that is formed by the differential stage 19'.

All analog-to-digital converters mentioned above can be realized by the same type of analog-to-digital converters as they are disclosed in detail by the U.S. Pat. No. 5,351,554 already referred to on page 3 above. The other aforementioned subcircuits are usual in electronics. For example, the subtractors can be part of a microprocessor.

I claim:

1. An instrumentation amplifier arrangement of an electromagnetic flowmeter
    which comprises a measuring tube with at least two measuring electrodes and a ground electrode as well as a coil arrangement for producing a magnetic field,
    said instrumentation amplifier arrangement comprising per measuring electrode:
        a preamplifier connected directly to the measuring electrode at its input end; and
        an analog-to-digital converter connected directly to an output of the preamplifier;
    said instrumentation amplifier arrangement further comprising:
        a clock generator supplying the analog-to-digital converters with a sampling signal
            whose frequency is greater than approximately 1 kHz; and
        a subtractor following the analog-to-digital converters.

2. An instrumentation amplifier arrangement of an electromagnetic flowmeter
    which comprises a measuring tube with at least two measuring electrodes and a ground electrode as well as a coil arrangement for producing a magnetic field,
    said instrumentation amplifier arrangement comprising:
        one preamplifier per measuring electrode, each preamplifier being directly connected to the associated measuring electrode;
        a first analog-to-digital converter connected directly to an output of one of the preamplifiers;
        a differential stage following the preamplifiers;
        a second analog-to-digital converter following the differential stage;
        a subtractor following the analog-to-digital converters; and
        at least one clock generator supplying the analog-to-digital converters with a sampling signal
            whose frequency is greater than approximately 1 kHz.

3. An instrumentation amplifier arrangement as claimed in claim 1, comprising a differential stage and a further analog-to-digital converter coupled to the output of the differential stage and controlled by the clock generator, with a respective one of inputs of the differential stage being connected to the output of the associated preamplifier, and the output of the further analog-to-digital converter being coupled to a further subtrahend input of the subtractor.

4. An instrumentation amplifier arrangement as claimed in claim 1 wherein the analog-to-digital converters are united in a main analog-to-digital converter, and a multiplexer is inserted between the input of the main analog-to-digital converter and the outputs of the preamplifiers.

5. An instrumentation amplifier arrangement as claimed in claim 2 wherein the analog-to-digital converters are united in a main analog-to-digital converter, and a multiplexer is inserted between the input of the main analog-to-digital converter and the outputs of the preamplifiers.

6. An instrumentation amplifier arrangement as claimed in claim 3 wherein a further input of the multiplexer is connected to the output of the differential stage.

7. An instrumentation amplifier arrangement as claimed in claim 4 wherein a further input of the multiplexer is connected to the output of the differential stage.

8. An instrumentation amplifier arrangement as claimed in claim 4 wherein a further input of the multiplexer is connected to the output of the differential stage.

* * * * *